United States Patent
Geng et al.

(10) Patent No.: US 12,438,757 B2
(45) Date of Patent: Oct. 7, 2025

(54) METHOD AND APPARATUS FOR WIRELESS COMMUNICATION, AND STORAGE MEDIUM

(71) Applicant: Greater Shine Limited, New Taipei (TW)

(72) Inventors: Jifeng Geng, San Diego, CA (US); Yanming Wang, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 441 days.

(21) Appl. No.: 17/880,344

(22) Filed: Aug. 30, 2022

(65) Prior Publication Data

US 2022/0376964 A1 Nov. 24, 2022

Related U.S. Application Data

(63) Continuation of application No. PCT/IB2020/058240, filed on Sep. 4, 2020.

(60) Provisional application No. 62/970,342, filed on Feb. 5, 2020.

(51) Int. Cl.
H04L 27/26 (2006.01)
H04L 25/03 (2006.01)

(52) U.S. Cl.
CPC .... *H04L 27/2605* (2013.01); *H04L 25/03834* (2013.01)

(58) Field of Classification Search
None
See application file for complete search history.

(56) References Cited

U.S. PATENT DOCUMENTS

| | | | |
|---|---|---|---|
| 2016/0294498 A1 | 10/2016 | Ma | |
| 2017/0280464 A1 | 9/2017 | Jagger et al. | |
| 2017/0331647 A1 | 11/2017 | Abdelghaffar | |
| 2018/0070192 A1* | 3/2018 | Lee | H04L 27/2626 |
| 2018/0083749 A1 | 3/2018 | Lee | |
| 2018/0092080 A1* | 3/2018 | Kim | H04L 5/0053 |
| 2018/0212698 A1 | 7/2018 | Sun | |
| 2019/0036657 A1 | 1/2019 | Zhao | |
| 2019/0132887 A1 | 5/2019 | Zhou et al. | |
| 2019/0356526 A1 | 11/2019 | Kuchi | |

(Continued)

FOREIGN PATENT DOCUMENTS

| | | |
|---|---|---|
| CN | 1466288 A | 1/2004 |
| CN | 106464639 A | 2/2017 |
| CN | 110537345 A | 12/2019 |

OTHER PUBLICATIONS

International Search Report issued in International Application No. PCT/IB2020/058240, mailed on May 25, 2021.

(Continued)

*Primary Examiner* — Luna Weissberger
(74) *Attorney, Agent, or Firm* — BAYES PLLC

(57) ABSTRACT

A method and apparatus for wireless communication and storage medium are provided. The apparatus includes at least one processor; and memory storing instructions that, when executed by the at least one processor, cause the apparatus at least to: determine a guard band width associated with a symbol based on information about resource allocation to the apparatus; set a pulse-shaping parameter associated with the symbol based on the guard band width; and output the symbol having a waveform based on the pulse-shaping parameter.

16 Claims, 7 Drawing Sheets

(56) References Cited

U.S. PATENT DOCUMENTS

2020/0178252 A1\* 6/2020 Li .......................... H04W 72/04
2022/0039158 A1\* 2/2022 Awadin ............. H04W 74/0866

OTHER PUBLICATIONS

Written Opinion of the International Searching Authority issued in International Application No. PCT/IB2020/058240, mailed on May 25, 2021.
Chen Wei et al., "Research and FPGA implementation of pulse shaping algorithm to reduce the PAPR of OFDM system" Cable Technology, issue 12, 2014, DOI:10.16045/j.cnki.catvtec.2014.12.018, 13 pages with English translation.
Sung-Moon (Michael) Yang, "OFDM signals based on shaping filters", MILCOM 2009—2009 IEEE Military Communications Conference, 2009, Jan. 15, 2010, DOI: 10.1109/MILCOM.2009.5380010, the whole document, 6 pages.
Notice of Allowance of the Chinese application No. 202080094291.9, issued on Aug. 24, 2023, 8 pages with English translation.

\* cited by examiner

METHOD AND APPARATUS FOR WIRELESS COMMUNICATION, AND STORAGE MEDIUM

CROSS-REFERENCE TO RELATED APPLICATIONS

This application is a continuation of International Application No. PCT/IB2020/058240, filed on Sep. 4, 2020, which claims the benefit of priority to U.S. Provisional Application No. 62/970,342, filed on Feb. 5, 2020, the contents of which are hereby incorporated by reference in their entireties.

BACKGROUND

Wireless communication systems are widely deployed to provide various telecommunication services such as telephony, video, data, messaging, and broadcasts. Orthogonal frequency division multiplexing (OFDM) is one of the most widely used and adopted digital multi-carrier modulation methods and has been used extensively for cellular communications, such as 4th-generation (4G) Long Term Evolution (LTE) and 5th-generation (5G) New Radio (NR). One version of OFDM, for example, used in 4G LTE, is cyclic prefix OFDM (CF-OFDM), which has a waveform form that is designed to overcome the inter-symbol interference (ISI) resulting from delays and reflections.

SUMMARY

The present disclosure relates to the field of wireless communication technologies, and provides a method and apparatus for wireless communication, and storage medium.

In a first aspect, there is provided an apparatus for wireless communication, which includes at least one processor and memory storing instructions. Execution of the instructions causes the apparatus to determine a guard band width associated with a symbol based on information about resource allocation to the apparatus. Execution of the instructions also causes the apparatus to set a pulse-shaping parameter associated with the symbol based on the guard band width. Execution of the instructions further causes the apparatus to output the symbol having a waveform based on the pulse-shaping parameter.

In a second aspect, there is provided a baseband chip, which includes a digital interface and a microcontroller operatively coupled to the digital interface. The digital interface is configured to receive resource allocation information of each OFDM symbol of a plurality of OFDM symbols in a next slot. The microcontroller is configured to dynamically set a weighted overlap-and-add (WOLA) parameter associated with each OFDM symbol based on the resource allocation information of the respective OFDM symbol and one or more adjacent OFDM symbols. The microcontroller is also configured to apply WOLA on at least one of the OFDM symbols in the next slot based on the WOLA parameter associated with the at least one OFDM symbol.

In a third aspect, there is provided a method for wireless communication. The method includes the following operations. A guard band width associated with a symbol is determined by at least one processor based on information about resource allocation to an apparatus including the at least one processor. A pulse-shaping parameter associated with the symbol is set by the at least one processor based on the guard band width. The symbol having a waveform based on the pulse-shaping parameter is outputted by the at least one processor.

In a fourth aspect, there is provided a method for wireless communication, implemented by a baseband chip. The method includes the following operations. Resource allocation information of each OFDM symbol of a plurality of OFDM symbols in a next slot is received. A WOLA parameter associated with each OFDM symbol is dynamically set based on the resource allocation information of the respective OFDM symbol and one or more adjacent OFDM symbols. WOLA is applied on at least one of the OFDM symbols in the next slot based on the WOLA parameter associated with the at least one OFDM symbol.

In a fifth aspect, there is provided a non-transitory computer-readable storage medium, which is encoded with instructions that, when executed by at least one processor of an apparatus, perform a process. The process includes determining a guard band width associated with a symbol based on information about resource allocation to the apparatus. The process also includes setting a pulse-shaping parameter associated with the symbol based on the guard band width. The process further includes outputting the symbol having a waveform based on the pulse-shaping parameter.

In a sixth aspect, there is provided a non-transitory computer-readable storage medium, which is encoded with instructions that, when executed by at least one processor, perform a process. The process includes receiving resource allocation information of each OFDM symbol of a plurality of OFDM symbols in a next slot. The process also includes dynamically setting a WOLA parameter associated with each OFDM symbol based on the resource allocation information of the respective OFDM symbol and one or more adjacent OFDM symbols. The process further includes applying WOLA on at least one of the symbols in the next slot based on the WOLA parameter associated with the at least one OFDM symbol.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
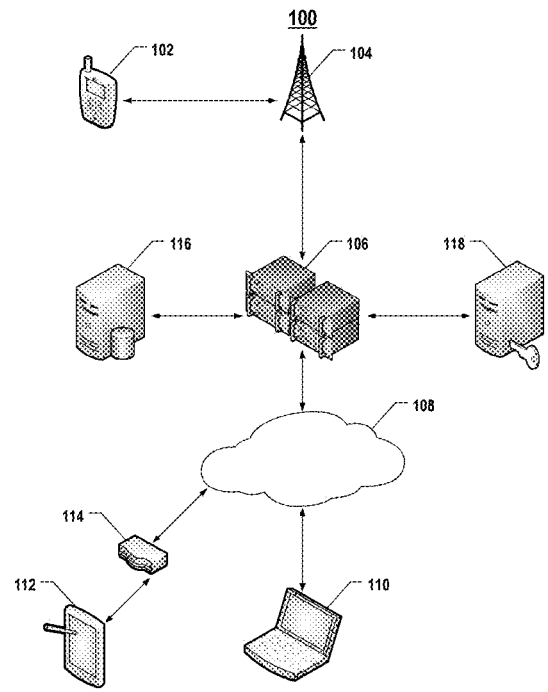
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as GSM. An OFDMA network may implement a RAT, such as LTE or NR. The techniques described herein may be used for the wireless networks and RATs mentioned above, as well as other wireless networks and RATs.

One of the drawbacks of conventional OFDM waveforms used in the 4G and 5G wireless networks, such as CP-OFDM, is the large out-of-band (OOB) emissions, despite its ability to inhibit the ISI between successive OFDM symbols. These emissions are undesirable and may cause harmful interference to adjacent channels. Various forms of OFDM waveforms using different pulse-shaping approaches, such as channel filtering or WOLA, have been proposed to meet the OOB emission threshold. WOLA is a technique in digital signal processing to effectively reduce the OOB emissions by smoothing the edges between two adjacent OFDM symbols. WOLA-OFDM is based on CP-OFDM, where a portion of the OFDM symbol is appended at the end overlapping with the beginning of the next OFDM symbol. In addition, time-domain windowing using a pulse with soft edges, such as a raised cosine window, can be applied to the appended portion, compared with a rectangular pulse in conventional OFDM. This leads to superior spectral containment and allows a smooth transition from one symbol to the next, which leads to better OOB attenuation compared with CP-OFDM. In filtered-OFDM (F-OFDM) based on channel filtering, the time-domain windowing in WOLA-OFDM is replaced with frequency-domain filtering to achieve further improvement in OOB attenuation.

However, known pulse-shaping approaches, including WOLA and channel filtering, work at the cost of reducing the effective ISI-free region, for example, in the cyclic prefix of an OFDM symbol. The overlapped part may cause signal distortion on the receiver side when the channel delay spread is large for users at the edge of the serving cell, which may degrade performance for cell-edge users. Moreover, known pulse-shaping approaches are usually applied blindly regardless of source allocation on each OFDM symbol, which wastes the effective ISI-free region for some OFDM symbols even when there are still enough margins for OOB emissions between those OFDM symbols.

Various embodiments in accordance with the present disclosure provide dynamic pulse-shaping (e.g., WOLA or channel filtering) to symbols (e.g., OFDM symbols) based on resource allocation to minimize the ISI while still passing the OOB emission mask. The apparatus and method disclosed herein can take advantage of the prior knowledge of the allocated resources for all physical channels on OFDM symbols to calculate the available guard band width between the active PRBs (e.g., in LTE) or BWP (e.g., in NR) and channel bandwidth edge for each symbol. Based on the guard band width, the optimal pulse-shaping parameters (e.g., WOLA parameters or channel filter parameters) can be adjusted symbol-by-symbol to minimize the drawback of applying pulse-shaping while passing the OOB emission mask. Moreover, the calculation complexity introduced by the dynamic pulse-shaping is trivial compared with the WOLA windowing process and does not need to be repeated when there is no change to the resource allocation. In some embodiments, for sufficiently large guard band (e.g., greater than a threshold), pulse-shaping is bypassed on the corresponding symbols to minimize the ISI and reduce processing. As a result, communication performance can be improved, in particular for users at the serving cell edges, compared with known solutions described above.

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 13:
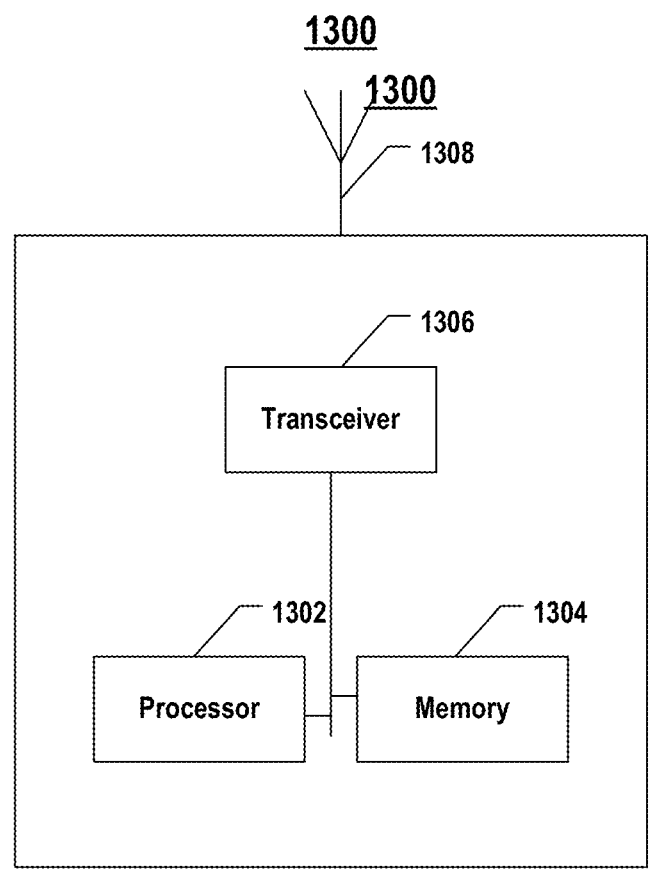
FIG. 13 illustrates a block diagram of an exemplary node, according to some embodiments of the present disclosure.

Each element in FIG. 1 may be considered a node of wireless network 100. More detail regarding the possible implementation of a node is provided by way of example in the description of a node 1300 in FIG. 13. Node 1300 may be configured as user equipment 102, access node 104, or core network element 106 in FIG. 1. Similarly, node 1300 may also be configured as computer 110, router 114, tablet 112, database 116, or authentication server 118 in FIG. 1. As shown in FIG. 13, node 1300 may include a processor 1302, a memory 1304, and a transceiver 1306. These components are shown as connected to one another by a bus, but other connection types are also permitted. When node 1300 is user equipment 102, additional components may also be included, such as a user interface (UI), sensors, and the like. Similarly, node 1300 may be implemented as a blade in a server system when node 1300 is configured as core network element 106. Other implementations are also possible.

Transceiver 1306 may include any suitable device for sending and/or receiving data. Node 1300 may include one or more transceivers, although only one transceiver 1306 is shown for simplicity of illustration. An antenna 1308 is shown as a possible communication mechanism for node 1300. Multiple antennas and/or arrays of antennas may be utilized. Additionally, examples of node 1300 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 13, node 1300 may include processor 1302. Although only one processor is shown, it is understood that multiple processors can be included. Processor 1302 may include microprocessors, microcontrollers (also known as "microcontroller units" (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 1302 may be a hardware device having one or more processing cores. Processor 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 13, node 1300 may also include memory 1304. Although only one memory is shown, it is understood that multiple memories can be included. Memory 1304 can broadly include both memory and storage. For example, memory 1304 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 1302. Memory 1304 may be used in any suitable forms, such as main/primary memory, embedded memory, external/secondary memory, cache, buffer, buffer cache, registers, and so on. Broadly, memory 1304 may be embodied by any computer-readable medium, such as a non-transitory computer-readable medium.

Processor 1302, memory 1304, and transceiver 1306 may be implemented in various forms in node 1300 for performing wireless communication functions. In some embodiments, processor 1302, memory 1304, and transceiver 1306 of node 1300 are implemented (e.g., integrated) on one or more system-on-chips (SoCs). In one example, processor 1302 and memory 1304 may be integrated on an application processor (AP) SoC (sometimes known as a "host," referred to herein as a "host chip") that handles application processing in an operating system environment, including generating raw data to be transmitted. In another example, processor 1302 and memory 1304 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 1302 and transceiver 1306 (and memory 1304 in some cases) may be integrated on a radio frequency (RF) SoC (sometimes known as a "transceiver," referred to herein as a "RF chip") that transmits and receives RF signals with antenna 1308. It is understood that in some examples, some or all of the host chip, baseband chip, and RF chip may be integrated as a single SoC. For example, a baseband chip and a RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104, or vice versa, via an uplink (UL), may dynamically adjust the waveforms of symbols (e.g., by applying WOLA or channel filtering on OFDM symbols) at the symbol level based on resource allocation to a node, as described below in detail. In some embodiments, the guard band width in the frequency-domain is determined based on the resource allocation (e.g., active PRBs or BWP) and the channel bandwidth edges, which is in turn used as the basis for setting the pulse-shaping parameter for adjusting the waveform of the symbol. In some embodiments, the guard band width is compared with a threshold to skip waveform adjustment (pulse-shaping) on certain symbols that have sufficient guard band widths to meet the OOB emission requirement to save processing resources. As a result, compared with known solutions, the ISI between symbols can be minimized while still passing the OOB emission mask, and the performance can be improved, for example, for user equipment 102 at the serving cell edge.

Figure 2:
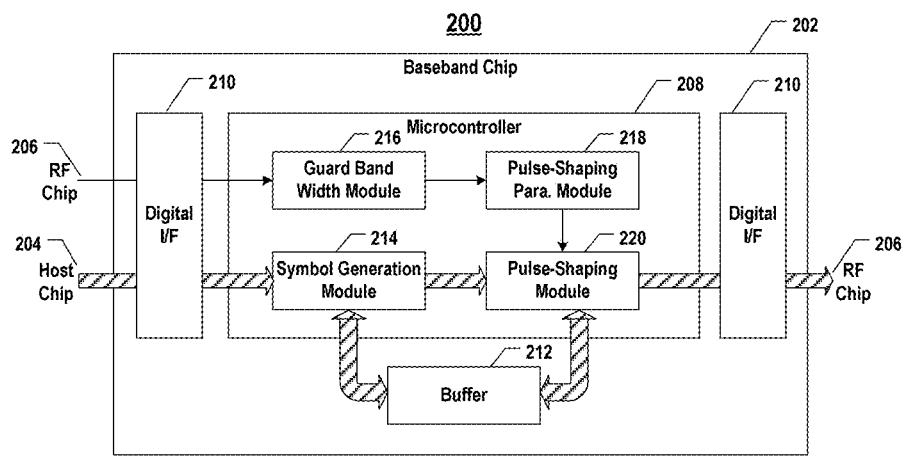
FIG. 2 illustrates a block diagram of an exemplary apparatus including a baseband chip for dynamic symbol pulse-shaping based on resource allocation, according to some embodiments of the present disclosure.

FIG. 2 illustrates a block diagram of an exemplary apparatus 200 including a baseband chip 202 for dynamic symbol pulse-shaping based on resource allocation, according to some embodiments of the present disclosure. Apparatus 200 may be an example of any suitable node of wireless network 100 in FIG. 1, such as user equipment 102 or access node 104. As shown in FIG. 2, apparatus 200 may include a baseband chip 202, a host chip 204, and a RF chip 206. In some embodiments, baseband chip 202 is implemented by processor 1302 and memory 1304, and RF chip 206 is implemented by processor 1302, memory 1304, and transceiver 1306, as described above with respect to FIG. 13. It is understood that besides the various modules in the uplink of baseband chip 202 shown in FIG. 2, any other suitable elements, such as modules in the downlink, may be included in baseband chip 202 as well. Although baseband chip 202 is illustrated as a standalone SoC in FIG. 2, it is understood that in one example, baseband chip 202 and RF chip 206 may be integrated as one SoC; in another example, baseband chip 202 and host chip 204 may be integrated as one SoC; in still another example, baseband chip 202, host chip 204, and RF chip 206 may be integrated as one SoC, as described above.

In some embodiments, baseband chip 202 includes a digital interface (UF) 210, a microcontroller 208 operatively coupled to digital interface 210, and buffer 212. Digital interface 210 can include any serial and parallel interface circuits (e.g., ports) that interface with host chip 204 and RF chip 206 with digital signals. In some embodiments, digital interface 210 is configured to receive resource allocation information of each one of a plurality of symbols (e.g., OFDM symbols) from RF chip 206. In one example in which apparatus 200 is user equipment 102, RF chip 206 may receive the resource allocation information from access node 104 (e.g., a base station) and forward the resource allocation information to baseband chip 202. It is understood that in some examples in which apparatus 200 is access node 104, digital interface 210 of baseband chip 202 may receive the resource allocation information from other sources, such as other elements in apparatus 200, e.g., host chip 204 or internal memory.

Host chip 204 may generate raw data to be transmitted in symbols (e.g., OFDM symbols). In some embodiments, digital interface 210 is also configured to receive the raw data from host chip 204 to be processed by microcontroller 208 to generate a stream of OFDM symbols. As buffer 212 (e.g., one example of memory 1304 in FIG. 13) may temporarily store the symbols in baseband chip 202, digital interface 210 may receive the resource allocation information in advance, for example, the resource allocation information of all the OFDM symbols in the next slot (e.g., 6 or 7 OFDM symbols) when baseband chip 202 is processing the OFDM symbols in the current slot. In some embodiments, digital interface 210 is also configured to output each symbol (e.g., OFDM symbol) in the next slot to RF chip 206 in digital signals after being dynamically pulse-shaped based on the resource allocation information by microcontroller 208. RF chip 206 may convert the symbols (e.g., OFDM symbols) from digital signals into analog signals (e.g., RF signals) and perform any suitable front-end RF functions, such as filtering, up-conversion, or sample-rate conversion, before being transmitted by the antenna(s) (not shown).

Microcontroller 208 may be one example of processor 1302 in FIG. 13. Baseband chip 202 may include a generic microcontroller responsible for all LTE or NR layers (e.g., the physical layer and media access control (MAC) layer) or a dedicated physical layer microcontroller. Nevertheless, microcontroller 208 can control and process information/data in the physical layer. In some embodiments in which WOLA-OFDM symbols are generated by baseband chip 202, microcontroller 208 is configured to dynamically set a WOLA parameter associated with each OFDM symbol based on the resource allocation information of the respective OFDM symbol and one or more adjacent OFDM symbols, and apply WOLA on at least one of the OFDM symbols in the next slot based on the WOLA parameter associated with the at least one OFDM symbol. In some embodiments in which F-OFDM symbols are generated by baseband chip 202, microcontroller 208 is configured to dynamically set the channel filter parameter associated with each OFDM symbol based on the resource allocation information of the respective OFDM symbol and one or more adjacent OFDM symbols, and adjust the channel filter parameter on each OFDM symbols in the next slot accordingly. Nevertheless, microcontroller 208 may include a symbol generation module 214, a guard band width module 216, a pulse-shaping parameter module 218, and a pulse-shaping module 220, as shown in FIG. 2. It is understood that in some examples, one or more modules described above may be implemented by other means besides microcontroller 208, for example, DSP, FPGA, ASIC, or any other hardware circuits.

In some embodiments, symbol generation module 214 is configured to generate a stream of symbols (e.g., OFDM symbols) from the raw data received by digital interface 210 from host chip 204. For example, symbol generation module 214 may first encode (e.g., by source coding and/or channel coding) the raw data and modulate the coded data using any suitable modulation techniques, such as multi-phase pre-shared key (MPSK) modulation or quadrature amplitude modulation (QAM). Symbol generation module 214 then may generate a stream of symbols on multiple subcarriers based on the modulated data. In one example, symbol generation module 214 may include a serial-to-parallel converter, an inverse fast Fourier transform (IFFT) unit, and a parallel-to-serial converter for generating OFDM symbols. Symbol generation module 214 may further insert a cyclic prefix (e.g., the last portion of the OFDM symbol) at the beginning of each OFDM symbol with guard interval exceeding delay spread of the multipath channel to mitigate the effect of the ISI. Each symbol may be stored in or retrieved from buffer 212 when being processed by symbol generation module 214.

In some embodiments, guard band width module 216 is configured to determine the guard band width associated with each symbol (e.g., OFDM symbol) based on information about resource allocation to apparatus 200. The edges of the channel bandwidth may be taken into consideration as well when determining the guard band width. In one example of 4G LTE, the information may include allocation of PRBs on each OFDM symbol and one or more adjacent OFDM symbols, and guard band width module 216 may be configured to determine the guard band width based on the allocation of the PRBs and the edge of the channel bandwidth. In another example of 5G NR, the information may include an active BWP on each OFDM symbol and one or more adjacent OFDM symbols, and guard band width module 216 may be configured to determine the guard band width based on the active BWP and the edge of the channel bandwidth. Each symbol (a current symbol) may have up to two adjacent symbols before and after the current symbol. In some embodiments, the resource allocation information (e.g., the allocation of PRBs or active BWP) on two adjacent OFDM symbols before and after the current OFDM symbol is used for determining the guard band of the current OFDM symbol. In some embodiments, the resource allocation information on one of the two adjacent OFDM symbols, either before or after the current OFDM symbol, is used for determining the guard band of the current OFDM symbol, for example, when the current OFDM symbol is the first or last OFDM symbol in the slot. The resource allocation information may be generated by access node 104 in FIG. 1 (e.g., an eNB for LTE and a gNB for NR) based on, for example, the channel characteristics of apparatus 200 and transmitted to apparatus 200 as part of downlink control information (DCI) during uplink scheduling.

Figure 3:
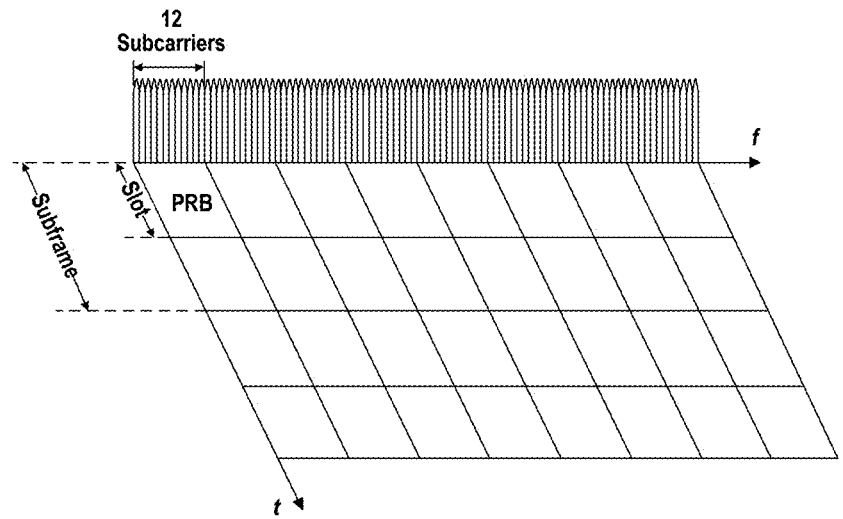
FIG. 3 illustrates exemplary physical resource blocks (PRBs) in OFDM, according to some embodiments of the present disclosure.
Figure 5:
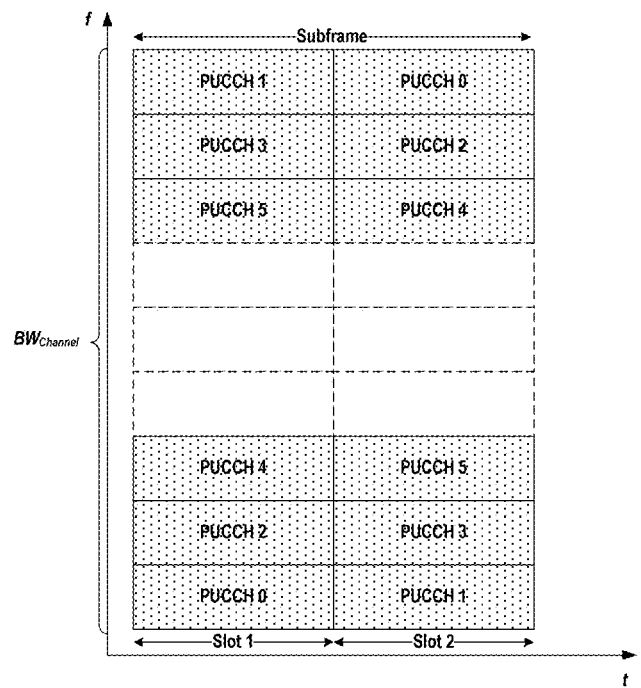
FIG. 5 illustrates exemplary resource allocation based on PRBs in 4G LTE, according to some embodiments of the present disclosure.

FIG. 3 illustrates exemplary PRBs in OFDM, according to some embodiments of the present disclosure. FIG. 5 illustrates exemplary resource allocation based on PRBs in 4G LTE, according to some embodiments of the present disclosure. In OFDM, physical time-frequency resources correspond to OFDM symbols and subcarriers within the OFDM symbols. The smallest physical time-frequency resource consists of one subcarrier in one OFDM symbol, known as a resource element (RE). The transmission of OFDM symbols is scheduled in the physical layer in groups, each consisting of 12 subcarriers in the frequency-domain (f) over one slot (half subframe) in the time-domain (t), known as PRBs, as shown in FIG. 3. The physical layer then can use the PRBs for transmission, representing either physical channels or physical signals. For example, in the uplink of LTE, the physical channels include a physical uplink shared channel (PUSCH) for transmission of uplink user data, a physical uplink control channel (PUCCH) for transmission of uplink user control information (UCI), and a physical random access channel (PRACH) for transmission of random-access requests. The physical signals include sounding reference signals (SRSs), which may be transmitted to the eNB about the channel characteristics of the user equipment for the eNB to allocate resources to the user equipment accordingly.

Resources, such as physical channels in the form of PRBs, may be allocated by a base station (e.g., an eNB in LTE) in the frequency-domain within the channel bandwidth. As shown in FIG. 5, in LTE, each PUCCH 0, 1, 2, 3, 4, or 5 may correspond to a PRB allocated to a respective user equipment 0, 1, 2, 3, 4, or 5 (e.g., apparatus 200) within the channel bandwidth ($BW_{Channel}$), which is scheduled by an eNB, for example, one or more slots in advance. For example, user equipment 0 may be allocated with PUCCH0 in slot 1 and slot 2, each of which is at a respective edge of the channel bandwidth (i.e., the outermost PRBs in the frequency-domain), while user equipment 4 may be allocated with PUCCH4 in slot 1 and slot 2, each of which is two PRBs away from the respective edge of the channel bandwidth (i.e., the third outermost PRBs in the frequency-domain). It is understood that although only PUCCHs are shown in FIG. 5, other uplink physical resources, such as PUSCH, PRACH, or SRS, may be allocated as well in the forms of PRBs by the eNB to a user equipment (e.g., apparatus 200) within the channel bandwidth over time in LTE. It is also understood that although each PUCCH lasts the entire slot as shown in FIG. 5 (e.g., each of the OFDM symbols in the same slot has the same PUCCH allocation), other uplink physical resources, such as PUSCH, may vary their allocation between symbols within the same slot. The resource allocation information that can be utilized by guard band width module 216 in FIG. 2 thus may include the allocation of the PRBs of each symbol and one or more adjacent symbols in the next slot (e.g., either both adjacent symbols before and after the respective symbol or just one of the adjacent symbols before or after the respective symbol), for example, where the PRBs representing each uplink physical resource (e.g., PUCCH or PUSCH) located in the frequency-domain with respect to the edges of the channel bandwidth.

Figure 6:
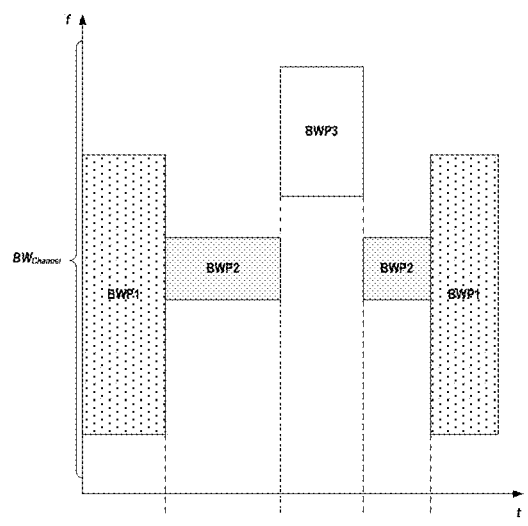
FIG. 6 illustrates exemplary resource allocation based on active bandwidth parts (BWPs) in 5G NR, according to some embodiments of the present disclosure.

FIG. 6 illustrates exemplary resource allocation based on active BWPs in 5G NR, according to some embodiments of the present disclosure. In NR, a subset or a part of the full channel bandwidth ($BW_{Channel}$) is referred to herein as a BWP, which forms a set of contiguous common resource blocks (CRBs) within the full channel bandwidth. A user equipment can be configured with up to four downlink BWPs and up to four uplink BWPs for each serving cell. In the case of supplementary uplink (SUL), there can be up to four additional uplink BWPs on the SUL carrier. Only one BWP in the uplink or downlink is active (referred to herein as "active BWP") at a given time on the active serving cell, which defines the user equipment's operating bandwidth (e.g., for transmitting uplink physical resources such as PUCCH and PUSCH) within the channel bandwidth. Each BWP may have its own sets of PRBs. As shown in FIG. 6, each BWP 1, 2, or 3 has its own preset bandwidth in the frequency-domain (f) within the channel bandwidth ($BW_{Channel}$), which is scheduled by a gNB, for example, one or more slots in advance. Active BWP 1, 2, or 3 is allocated on each OFDM symbol in the time-domain (t) to a user equipment (e.g., apparatus 200), and OFDM symbols allocated with the same active BWP 1, 2, or 3 thus have the same resource allocation. The resource allocation information that can be utilized by guard band width module 216 in FIG. 2 thus may include the active BWP on each symbol and one or more adjacent symbols in the next slot (e.g., either both adjacent symbols before and after the respective symbol or just one of the adjacent symbols before or after the respective symbol), for example, where the active BWP defines the uplink physical resources (e.g., PUCCH or PUSCH) located in the frequency-domain with respect to the edges of the channel bandwidth.

Figure 4:
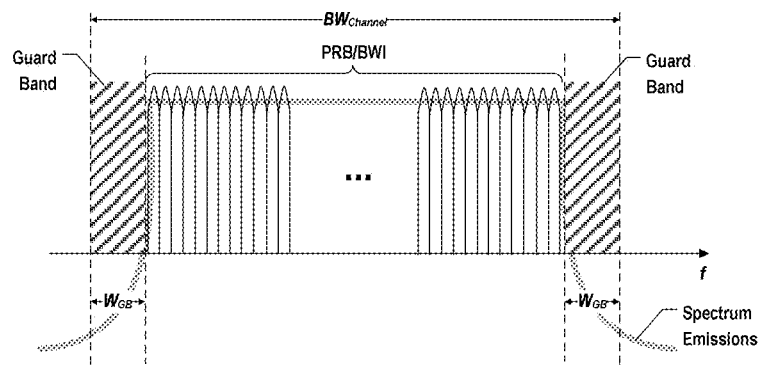
FIG. 4 illustrates exemplary guard bands in OFDM, according to some embodiments of the present disclosure.

As shown in FIG. 2, based on the resource allocation information, for example, in LTE or NR, guard band width module 216 may be configured to calculate the available width of the guard band between the PRBs/active BWP and the edges of the channel bandwidth for each OFDM symbol. FIG. 4 illustrates exemplary guard bands in OFDM, according to some embodiments of the present disclosure. The channel bandwidth ($BW_{Channel}$) may vary in LTE and NR. A guard band referred to herein may be an unused part of the channel bandwidth in the frequency-domain (f) between the edge of the channel bandwidth and the uplink physical resource, for example, active PRBs or BWP, allocated to apparatus 200 on OFDM symbols as described above in detail. The guard band width ($W_{GB}$) may be the frequency range of the guard band, which can be calculated based on the channel bandwidth and resource allocation information of each OFDM symbol and one or more adjacent OFDM symbols (e.g., either both adjacent OFDM symbols before and after the respective OFDM symbol or just one of the adjacent OFDM symbols before or after the respective OFDM symbol).

Referring back to FIG. 2, in some embodiments, as the resource allocation information is scheduled one slot in advance, guard band width module 216 is configured to determine the guard band width associated with each symbol one slot in advance, i.e., all the symbols in the next slot. It is also understood that as some physical resources, e.g., PUCCH, is allocated in a batch, e.g., in a slot, meaning that the resource allocation information may not change in a certain time period, guard band width module 216 may not need to determine the guard band width for each symbol if there is not any change to the resource allocation between symbols. In other words, guard band width module 216 may first determine whether there is an update to the resource allocation in the next symbol or next slot and calculate the available width of the guard band for the next symbol or symbols in the next slot only in response to an update to the resource allocation information.

In some embodiments, pulse-shaping parameter module 218 is configured to set a pulse-shaping parameter associated with each symbol based on the guard band width associated with the symbol. Pulse-shaping parameter module 218 may be configured to compare the guard band width associated with a symbol with a threshold, e.g., a preset value, to determine whether the pulse-shaping parameter can be set to "0" or any other value indicative of skipping/bypassing the pulse-shaping on the symbol, such that the waveform of the symbol remains intact in its original form. That is, if there is the guard band width is sufficiently large to pass the OOB emission mask, then pulse-shaping may become unnecessary, and the waveform of the corresponding symbol may not need to be adjusted, which can help the ISI and reduce processing resource waste. On the other hand, if it is determined that pulse-shaping is still needed to adjust the waveform of the symbol for OOB emission attenuation, the pulse-shaping parameter can be set specifically to the symbol based on the guard band width associated with the symbol. That is, instead of blindly setting the pulse-shaping parameter for a symbol regardless of the resource allocation on the symbol and the resulting guard band width, pulse-shaping parameter module 218 may customize the pulse-shaping parameter for each symbol based on its resource allocation and the resulting guard band width to minimize the ISI while still passing the OOB emission mask. In other words, guard band width module 216 can dynamically set the pulse-shaping parameter (including "0") associated with each symbol based on the dynamically changed resource allocation information.

In some embodiments, the pulse-shaping parameter includes a WOLA parameter, such as the window size, rolling parameter (e.g., indicative of the ramping profile), or any other parameters that affect the weight of WOLA. In some embodiments, the pulse-shaping parameter includes a channel filter parameter, such as an on/off binary switch of a low-pass filter, the parameters setting the characteristics the low-pass filter (e.g., the filter order, cutoff frequency, frequency roll-off, etc.), or any other parameters that affect the channel filtering. It is understood that depending on the pulse-shaping approach to be used to adjust the waveform of the symbol, any other suitable shaping parameters may be used as well. In order to set the pulse-shaping parameter, pulse-shaping parameter module 218 may obtain a look-up table, a function, a preset rule, or any other models that establish a relationship between various guard band widths and different values of the pulse-shaping parameter. In some embodiments, the larger the guard band width is, the smaller the pulse-shaping parameter is, meaning that less adjustment is to be made to the waveform of the symbol. The pulse-shaping parameter may become "0" to bypass the pulse-shaping if the guard band width becomes greater than a threshold.

A shown in FIG. 2, pulse-shaping module 220 is configured to output each symbol having a waveform based on the pulse-shaping parameter, for example, to digital interface 210 to be transmitted to RF chip 206, according to some embodiments. Pulse-shaping module 220 may receive the pulse-shaping parameters from pulse-shaping parameter module 218 and the symbols (e.g., OFDM symbols) from symbol generation module 214 directly or through buffer 212. In some embodiments, pulse-shaping module 220 temporarily holds the pulse-shaping parameters (e.g., in buffer 212) for one slot until receiving the symbols in the next slot from symbol generation module 214. Depending on the pulse-shaping parameter associated with each symbol, pulse-shaping module 220 may skip pulse-shaping of a symbol, for example, when the pulse-shaping parameter is "0," such that the symbol has a waveform in the original form without adjustment. Otherwise, pulse-shaping module 220 may adjust the waveform of a symbol from the original form to an adjusted form based on the associated pulse-shaping parameter. In one example in which the pulse-shaping approach is channel filtering, pulse-shaping module 220 may adjust the waveform of the symbol by adjusting the channel filter parameter, for example, to adjust the characteristics of one or more low-pass filters applied to an OFDM symbol if the channel filter is "on" to generate an F-OFDM symbol or may skip applying channel filtering to the OFDM symbol if the channel filter is "off."

In some embodiments in which the pulse-shaping approach is WOLA, pulse-shaping module 220 is configured to adjust the waveform of an OFDM symbol by applying WOLA to the OFDM symbol based on the associated WOLA parameter to generate a WOLA-OFDM symbol. In case the WOLA parameter is set to be "0," pulse-shaping module 220 may skip WOLA on the corresponding OFDM symbol. Examples of WOLA implementation on OFDM symbols by pulse-shaping module 220 are described below with respect to FIGS. 7-9.

Figure 7:
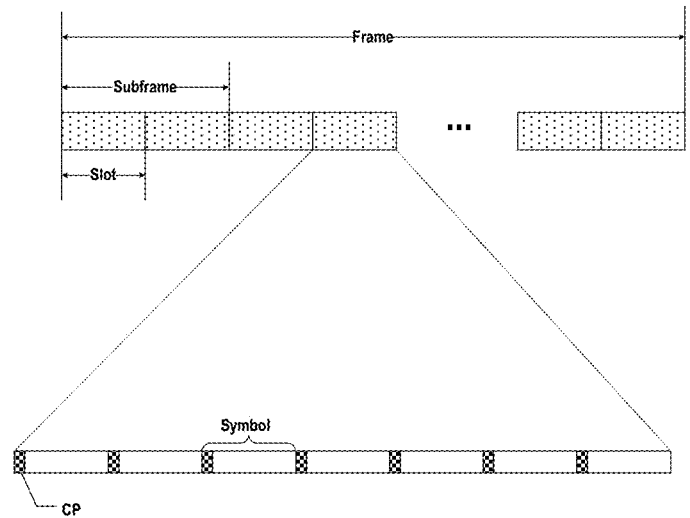
FIG. 7 illustrates an exemplary frame structure and symbol structure, according to some embodiments of the present disclosure.
Figure 8:
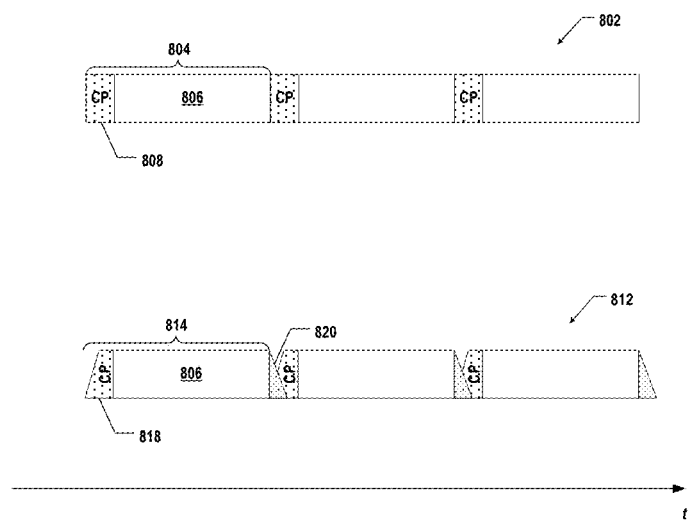
FIG. 8 illustrates exemplary CP-OFDM symbols and WOLA-OFDM symbols, according to some embodiments of the present disclosure.
Figure 9:
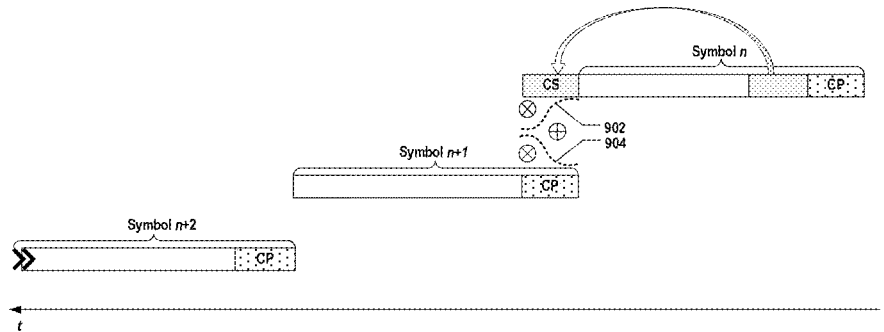
FIG. 9 illustrates an exemplary process of dynamic WOLA on OFDM symbols, according to some embodiments of the present disclosure.

FIG. 7 illustrates an exemplary frame structure and symbol structure, according to some embodiments of the present disclosure. FIG. 8 illustrates exemplary CP-OFDM symbols and WOLA-OFDM symbols, according to some embodiments of the present disclosure. FIG. 9 illustrates an exemplary process of dynamic WOLA on OFDM symbols, according to some embodiments of the present disclosure. As shown in FIG. 7, a radio frame may have a length of 10 milliseconds (ms) and may be divided into 10 equally sized subframes of 1 ms in length. Scheduling may be done on a subframe basis for both the downlink and uplink. Each subframe consists of two equally sized slots of 0.5 ms in length. Each slot in turn consists of a number of OFDM symbols, e.g., 6 or 7 OFDM symbols. Each ODFM symbol may include a cyclic prefix (CP) in the beginning. Depending on the number of OFDM symbols in a slot, an OFDM symbol may include an extended cyclic prefix or a normal cyclic prefix.

For example, FIG. 8 illustrates a stream 802 of CP-OFDM symbols 804 in the time-domain (t). Each CP-OFDM symbol 804 may include a payload 806 carrying data and a cyclic prefix (CP) 808 at the beginning of CP-OFDM symbol 804, which can preserve the orthogonality of the subcarriers and serve as a guard interval preventing the ISI between successive CP-OFDM symbols 804. When the signal is demodulated, the N-point fast Fourier transform (FFT) is taken at payload 806 after cyclic prefix 808. In some embodiments, the last portion of payload 806 (e.g., some samples at the end of payload 806) of CP-OFDM symbol 804 is inserted at the beginning of payload 806 of CP-OFDM symbol 804 as cyclic prefix 808.

FIG. 8 also illustrates a stream 812 of WOLA-OFDM symbols 814 in the time-domain by applying WOLA to stream 802 of CP-OFDM symbols 804. Each WOLA-OFDM symbol 814 may include a weighted cyclic prefix 818 at the beginning of WOLA-OFDM symbol 814, followed by payload 806. A weighted cyclic suffix 820 may be appended to the end of WOLA-OFDM symbol 814. Weighted cyclic prefix 818 and weight cyclic suffix 820 may be formed by a windowing process that applies a ramping-up window and ramping-down window (e.g., a raised cosine window), respectively. In some embodiments, the last portion of payload 806 (e.g., some samples at the end of payload 806) of WOLA-OFDM symbol 814 is multiplied with a ramping-up window and inserted at the beginning of payload 806 of CP-OFDM symbol 804 as weighted cyclic prefix 818. In some embodiments, the beginning portion of payload 806 (e.g., some samples at the beginning of payload 806) of WOLA-OFDM symbol 814 is multiplied with a ramping-down window and appended to the end of payload 806 of CP-OFDM symbol 804 as weighted cyclic suffix 820. As weighted cyclic suffix 820 of each WOLA-OFDM symbol 814 may overlap weighted cyclic prefix 818 of the next WOLA-OFDM symbol 814, the summation of weighted cyclic suffix 820 and weighted cyclic prefix 818 of successive WOLA-OFDM symbols 814 can form a smooth transition between the boundaries of successive WOLA-OFDM symbols 814, which helps to reduce the OOB emissions. A WOLA parameter may include any parameters that can define the ramping-down window for forming weight cyclic suffix 820, such as the window size or rolling parameter (e.g., the roll-off factor in raised cosine window).

As shown in FIG. 9, a portion of a CP-OFDM symbol n may be appended to the end of symbol n and multiplied by a ramping-down window 902 to become a weighted cyclic suffix (CS). The WOLA parameter for symbol n, such as the window size or rolling parameter of ramping-down window 902, may be set based on the guard band width associated with symbol n, which may be determined based on resource allocation on symbol n and one or both of symbol n−1 (not shown) and symbol n+1. As shown in FIG. 9, the weighted cyclic suffix of symbol n may overlap the cyclic prefix (CP) of next CP-OFDM symbol n+1, which may be weighted by multiplying a ramping-up window 904. The overlapped weighed cyclic prefix of symbol n+1 and weighed cyclic suffix of symbol n may be added to form a smooth transition between symbol n and symbol n+1. For symbol n+1, since the resource allocation on symbols n, n+1, and n+2 (not shown) may be different from the resource allocation on symbols n−1 (not shown), n, and n+1, the guard band width associated with symbol n+1 may thus be different from the guard band width associated with symbol n. In case the guard band width associated with symbol n+1 becomes greater than a preset threshold, the WOLA parameter for symbol n+1 may thus be set to skip WOLA on symbol n+1.

As shown in FIG. 9, there is no cyclic suffix at the end of symbol n+1 to be overlapped with the cyclic prefix of next CP-OFDM symbol n+2.

Figure 10:
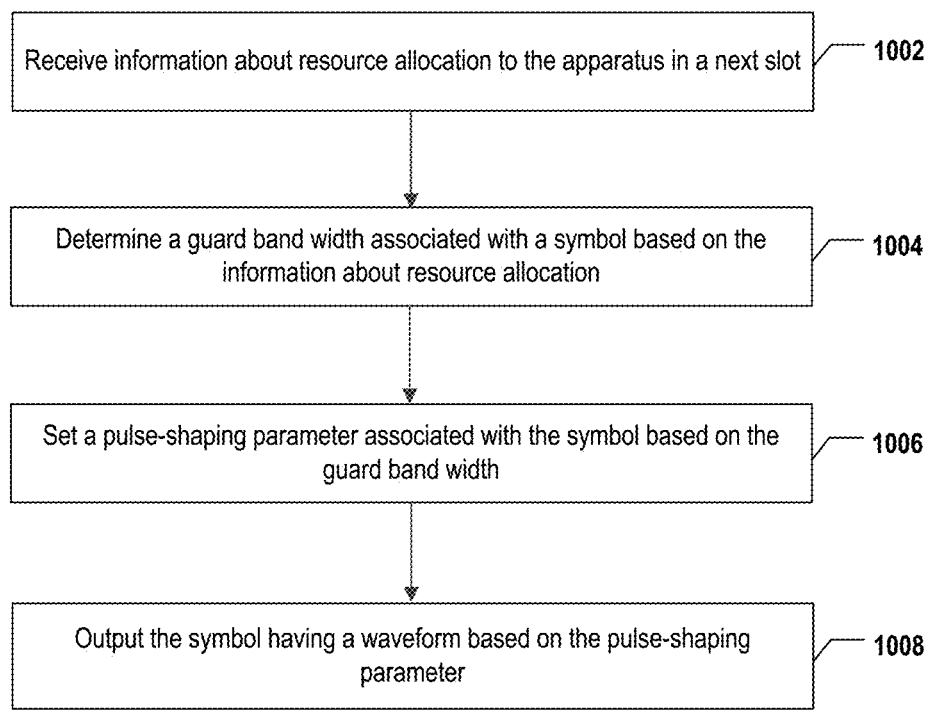
FIG. 10 illustrates a flow chart of an exemplary method for dynamic symbol pulse-shaping based on resource allocation, according to some embodiments of the present disclosure.

FIG. 10 illustrates a flow chart of an exemplary method 1000 for dynamic symbol pulse-shaping based on resource allocation, according to some embodiments of the present disclosure. Examples of the apparatus that can perform operations of method 1000 include, for example, apparatus 200 depicted in FIG. 2 or any other suitable apparatus disclosed herein. It is understood that the operations shown in method 1000 are not exhaustive and that other operations can be performed as well before, after, or between any of the illustrated operations. Further, some of the operations may be performed simultaneously, or in a different order than shown in FIG. 10.

Referring to FIG. 10, method 1000 starts at operation 1002, in which information about resource allocation to the apparatus in the next slot including a symbol and one or more adjacent symbols is received. Each symbol may have up to two adjacent symbols before and after the symbol in the next slot. Each symbol may be an OFDM symbol, and the information may be received from a base station or the apparatus. As shown in FIG. 2, digital interface 210 of baseband chip 202 in apparatus 200, such as user equipment 102 in FIG. 1, may receive resource allocation information for OFDM symbols in the next slot from access node 104 (e.g., an eNB or gNB) as part of the DCI during uplink scheduling.

Method 1000 proceeds to operation 1004, as illustrated in FIG. 10, in which a guard band width associate with the symbol is determined based on the information about resource allocation. In some embodiments, the information includes allocation of PRBs on the symbol and one or more adjacent symbols, and the guard band width is determined based on the allocation of the PRBs and the edge of the channel band width. In some embodiments, the information includes the active BWP(s) on the symbol and the one or more adjacent symbols, and the guard band width is determined based on the active BWP(s) and the edge of the channel band width. As shown in FIG. 2, guard band width module 216 of baseband chip 202 in apparatus 200 may determine the guard band width associated with each OFDM symbol based on the allocation of the PRBs or active BWP on the OFDM symbol and one or more adjacent OFDM symbols.

Method 1000 proceeds to operation 1006, as illustrated in FIG. 10, in which a pulse-shaping parameter associated with the symbol is set based on the guard band width. Method 1000 proceeds to operation 1008, as illustrated in FIG. 10, in which the symbol having a waveform based on the pulse-shaping parameter is outputted. In some embodiments, in response to the guard band width being greater than a threshold, the pulse-shaping parameter is set such that the waveform of the symbol is in the original form without adjustment. In some embodiments, in response to the guard band width being not greater than the threshold, the waveform of the symbol is adjusted from the original form to an adjusted form based on the pulse-shaping parameter. As shown in FIG. 2, pulse-shaping parameter module 218 of baseband chip 202 in apparatus 200 may set the pulse-shaping parameter associated with each OFDM symbol based on the guard band width associated with the OFDM symbol. Pulse-shaping module 220 of baseband chip 202 in apparatus 200 may output each OFDM symbol having a waveform based on the pulse-shaping parameter. The details of operations 1004 and 1006 are described below with respect to FIG. 11.

Figure 11:
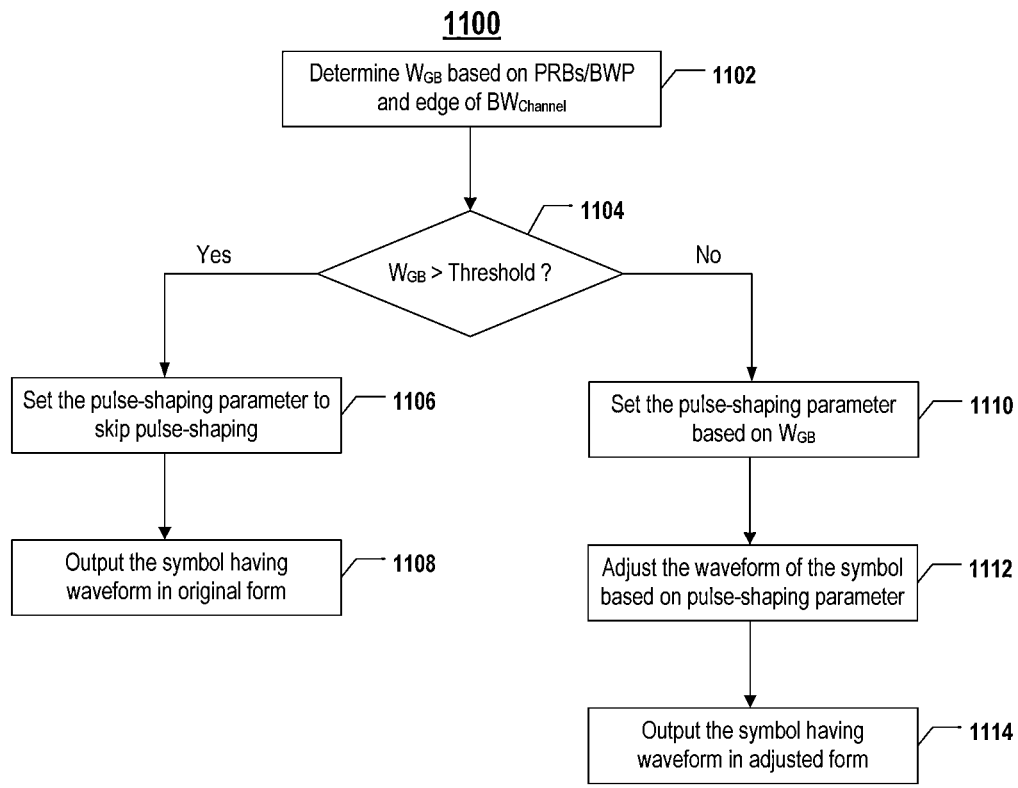
FIG. 11 illustrates a flow chart of another exemplary method for dynamic symbol pulse-shaping based on resource allocation, according to some embodiments of the present disclosure.

Referring to FIG. 11, method 1100 starts at operation 1102, in which the guard band width is determined based on the edge of the channel bandwidth and the allocation of PRBs or active BWP on each symbol and one or more adjacent symbols. In some embodiments, the available frequency range between the outmost active PRB or BWP on the symbol and the respective edge of the channel bandwidth is calculated for determining the guard band width.

Method 1100 proceeds to operation 1104, as illustrated in FIG. 11, in which the guard band width is compared with a threshold to determine whether the guard band width is greater than the threshold. If the guard band width is greater than the threshold at operation 1104, method 1100 proceeds to operation 1106 in which the pulse-shaping parameter associated with the symbol is set to skip pulse-shaping. Method 1100 then proceeds to operation 1108, as illustrated in FIG. 11, in which the symbol having a waveform in the original form without adjustment is outputted.

If the guard band width is not greater than the threshold at operation 1104, method 1100 proceeds to operation 1110 in which the pulse-shaping parameter associated with the symbol is set based on the guard band width. Method 1100 then proceeds to operation 1112, as illustrated in FIG. 11, in which the waveform of the symbol is adjusted from the original form to an adjusted form based on the associated pulse-shaping parameter. Method 1100 proceeds to operation 1114, as illustrated in FIG. 11, in which the symbol having a waveform in the adjusted form is outputted. In one example, the pulse-shaping parameter includes a channel filter parameter, and the waveform of a symbol is adjusted by adjusting the channel filter parameter. In another example, the pulse-shaping parameter includes a WOLA parameter, and the waveform of a symbol is adjusted by applying WOLA to the symbol based on the WOLA parameter, which is described below in detail with respect to FIG. 12.

Figure 12:
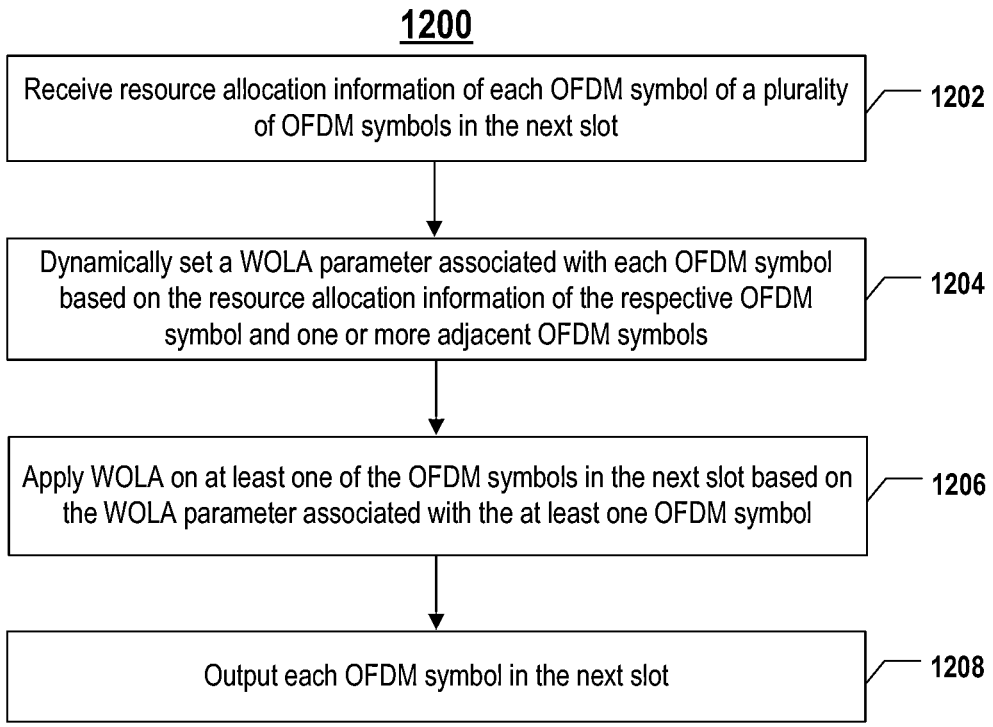
FIG. 12 illustrates a flow chart of an exemplary method for dynamic WOLA on OFDM symbols based on resource allocation, according to some embodiments of the present disclosure.

FIG. 12 illustrates a flow chart of an exemplary method 1200 for dynamic WOLA on OFDM symbols based on resource allocation, according to some embodiments of the present disclosure. Examples of the apparatus that can perform operations of method 1200 include, for example, baseband chip 202 depicted in FIG. 2 or any other suitable apparatus disclosed herein. It is understood that the operations shown in method 1200 are not exhaustive and that other operations can be performed as well before, after, or between any of the illustrated operations. Further, some of the operations may be performed simultaneously, or in a different order than shown in FIG. 12.

Referring to FIG. 12, method 1200 starts at operation 1202, in which resource allocation information of each OFDM symbol of a plurality of OFDM symbols in the next slot is received. The resource allocation information may include the allocation of PRBs or active BWP. The edge of the channel bandwidth may be obtained as well.

Method 1200 proceeds to operation 1204, as illustrated in FIG. 12, in which a WOLA parameter associated with each OFDM symbol is set based on the resource allocation information of the respective OFDM symbol and one or more adjacent OFDM symbols. A guard band width associated with each OFDM symbol may be determined based on the resource allocation information of the respective OFDM symbol and the one or more adjacent OFDM symbols. The guard band width may be determined based on the edge of the channel bandwidth and the allocation of the PRBs or the active BWP. The guard band width associated with the respective OFDM symbol then may be compared with a threshold. In some embodiments, in response to the guard band width being not greater than the threshold, the WOLA parameter associated with the respective OFDM symbol is set based on the guard band width. In some embodiments, in response to the guard band width being greater than the threshold, the WOLA parameter associated with the respective OFDM symbol is set to skip WOLA on the respective symbol.

Method 1200 proceeds to operation 1206, as illustrated in FIG. 12, in which WOLA is applied on at least one of the OFDM symbols in the next slot based on the WOLA parameter associated with the at least one OFDM symbol. Method 1200 proceeds to operation 1208, as illustrated in FIG. 12, in which each OFDM symbol in the next slot is outputted. The outputted OFDM symbols may include at least one WOLA-OFDM. It is understood that in some examples, at least one of the outputted OFDM symbols may not be applied with WOLA, e.g., a CP-OFDM symbol. It is further understood that in some examples, each outputted OFDM symbol may be a CP-OFDM symbol or a WOLA-OFDM symbol. Nevertheless, the pulse-shaping on each outputted OFDM symbol, i.e., the form of the waveform thereof, may be dynamically determined based on resource allocation.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 1300 in FIG. 13. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, an apparatus for wireless communication includes at least one processor and memory storing instructions. Execution of the instructions causes the apparatus to determine a guard band width associated with a symbol based on information about resource allocation to the apparatus. Execution of the instructions also causes the apparatus to set a pulse-shaping parameter associated with the symbol based on the guard band width. Execution of the instructions further causes the apparatus to output the symbol having a waveform based on the pulse-shaping parameter.

In some embodiments, the information includes allocation of PRBs on the symbol and one or more adjacent symbols. In some embodiments, execution of the instructions further causes the apparatus to determine the guard band width based on the allocation of the PRBs and an edge of a channel bandwidth.

In some embodiments, the information includes an active BWP on the symbol and one or more adjacent symbols. In some embodiments, execution of the instructions further causes the apparatus to determine the guard band width based on the active BWP and an edge of a channel bandwidth.

In some embodiments, execution of the instructions further causes the apparatus to, in response to the guard band width being greater than a threshold, set the pulse-shaping parameter such that the waveform of the symbol is in an original form without adjustment.

In some embodiments, execution of the instructions further causes the apparatus to, in response to the guard band width being not greater than a threshold, adjust the waveform of the symbol from an original form to an adjusted form based on the pulse-shaping parameter.

In some embodiments, the pulse-shaping parameter includes a WOLA parameter, and execution of the instructions further causes the apparatus to adjust the waveform of the symbol by applying WOLA to the symbol based on the WOLA parameter.

In some embodiments, the pulse-shaping parameter includes a channel filter parameter, and execution of the instructions further causes the apparatus to adjust the waveform of the symbol by adjusting the channel filter parameter.

In some embodiments, execution of the instructions further causes the apparatus to receive the information about resource allocation to the apparatus in a next slot comprising the symbol.

According to another aspect of the present disclosure, a baseband chip includes a digital interface and a microcontroller operatively coupled to the digital interface. The digital interface is configured to receive resource allocation information of each OFDM symbol of a plurality of OFDM symbols in a next slot. The microcontroller is configured to dynamically set a WOLA parameter associated with each OFDM symbol based on the resource allocation information of the respective OFDM symbol and one or more adjacent OFDM symbols. The microcontroller is also configured to apply WOLA on at least one of the OFDM symbols in the next slot based on the WOLA parameter associated with the at least one OFDM symbol.

In some embodiments, to dynamically set the WOLA parameter, the microcontroller is configured to determine a guard band width associated with each OFDM symbol based on the resource allocation information of the respective OFDM symbol and the one or more adjacent OFDM symbols, and compare the guard band width associated with the respective OFDM symbol with a threshold.

In some embodiments, to dynamically set the WOLA parameter, the microcontroller is configured to, in response to the guard band width being not greater than the threshold, set the WOLA parameter associated with the respective OFDM symbol based on the guard band width.

In some embodiments, to dynamically set the WOLA parameter, the microcontroller is configured to, in response to the guard band width being greater than the threshold, set the WOLA parameter associated with the respective OFDM symbol to skip WOLA on the respective OFDM symbol.

In some embodiments, the resource allocation information includes allocation of PRBs, and the guard band width is determined based on the allocation of the PRBs and an edge of a channel bandwidth.

In some embodiments, the resource allocation information comprises an active BWP, and the guard band width is determined based on the active BWP and an edge of a channel bandwidth.

In some embodiments, the digital interface is further configured to output each OFDM symbol in the next slot.

According to still another aspect of the present disclosure, an apparatus for wireless communication includes a guard band width module, a pulse-shaping parameter module, and a pulse-shaping module. The guard band width module is configured to determine a guard band width associated with a symbol based on information about resource allocation to the apparatus. The pulse-shaping parameter module is configured to set a pulse-shaping parameter associated with the symbol based on the guard band width. The pulse-shaping module is configured to output the symbol having a waveform based on the pulse-shaping parameter.

In some embodiments, the information includes allocation of PRBs on the symbol and one or more adjacent symbols. In some embodiments, the guard band width module is configured to determine the guard band width based on the allocation of the PRBs and an edge of a channel bandwidth.

In some embodiments, the information includes an active BWP on the symbol and one or more adjacent symbols. In some embodiments, the guard band width module is configured to determine the guard band width based on the active BWP and an edge of a channel bandwidth.

In some embodiments, the pulse-shaping parameter module is configured to, in response to the guard band width being greater than a threshold, set the pulse-shaping parameter such that the waveform of the symbol is in an original form without adjustment.

In some embodiments, the pulse-shaping module is configured to, in response to the guard band width being not greater than a threshold, adjust the waveform of the symbol from an original form to an adjusted form based on the pulse-shaping parameter.

In some embodiments, the pulse-shaping parameter includes a WOLA parameter, and the pulse-shaping module is configured to adjust the waveform of the symbol by applying WOLA to the symbol based on the WOLA parameter.

In some embodiments, the pulse-shaping parameter includes a channel filter parameter, and the pulse-shaping module is configured to adjust the waveform of the symbol by adjusting the channel filter parameter.

In some embodiments, the guard band width module is further configured to receive the information about resource allocation to the apparatus in a next slot including the symbol.

According to yet another aspect of the disclosure, a method for wireless communication is disclosed. A guard band width associated with a symbol is determined, by at least one processor, based on information about resource allocation to an apparatus including the at least one processor. A pulse-shaping parameter associated with the symbol is set, by the at least one processor, based on the guard band width. The symbol having a waveform based on the pulse-shaping parameter is outputted by the at least one processor.

In some embodiments, the information includes allocation of PRBs on the symbol and one or more adjacent symbols. In some embodiments, the guard band width is determined based on the allocation of the PRBs and an edge of a channel bandwidth.

In some embodiments, the information includes an active BWP on the symbol and one or more adjacent symbols. In some embodiments, the guard band width is determined based on the active BWP and an edge of a channel bandwidth.

In some embodiments, in response to the guard band width being greater than a threshold, the pulse-shaping parameter is set such that the waveform of the symbol is in an original form without adjustment.

In some embodiments, in response to the guard band width being not greater than a threshold, the waveform of the symbol is adjusted from an original form to an adjusted form based on the pulse-shaping parameter.

In some embodiments, the pulse-shaping parameter includes a WOLA parameter, and the waveform of the symbol is adjusted by applying WOLA to the symbol based on the WOLA parameter.

In some embodiments, the pulse-shaping parameter includes a channel filter parameter, and the waveform of the symbol is adjusted by adjusting the channel filter parameter.

In some embodiments, the information about resource allocation to the apparatus in a next slot including the symbol is received.

According to yet another aspect of the disclosure, a method implemented by a baseband chip for wireless communication is disclosed. Resource allocation information of each OFDM symbol of a plurality of OFDM symbols in a next slot is received. A WOLA parameter associated with each OFDM symbol is dynamically set based on the resource allocation information of the respective OFDM symbol and one or more adjacent OFDM symbols. WOLA is applied on at least one of the OFDM symbols in the next slot based on the WOLA parameter associated with the at least one OFDM symbol.

In some embodiments, to dynamically set the WOLA parameter, a guard band width associated with each OFDM symbol is determined based on the resource allocation information of the respective OFDM symbol and the one or more adjacent OFDM symbols, and the guard band width associated with the respective OFDM symbol is compared with a threshold.

In some embodiments, to dynamically set the WOLA parameter, in response to the guard band width being not greater than the threshold, the WOLA parameter associated with the respective OFDM symbol is set based on the guard band width.

In some embodiments, to dynamically set the WOLA parameter, in response to the guard band width being greater than the threshold, the WOLA parameter associated with the respective OFDM symbol is set to skip WOLA on the respective symbol.

In some embodiments, the resource allocation information includes allocation of PRBs, and the guard band width is determined based on the allocation of the PRBs and an edge of a channel bandwidth.

In some embodiments, the resource allocation information includes an active BWP, and the guard band width is determined based on the active BWP and an edge of a channel bandwidth.

In some embodiments, each OFDM symbol in the next slot is outputted.

According to yet another aspect of the disclosure, a non-transitory computer-readable medium is encoded with instructions that, when executed by at least one processor of an apparatus, perform a process. The process includes determining a guard band width associated with a symbol based on information about resource allocation to the apparatus. The process also includes setting a pulse-shaping parameter associated with the symbol based on the guard band width. The process further includes outputting the symbol having a waveform based on the pulse-shaping parameter.

According to yet another aspect of the disclosure, a non-transitory computer-readable medium is encoded with instructions that, when executed by at least one processor, perform a process. The process includes receiving resource allocation information of each OFDM symbol of a plurality of OFDM symbols in a next slot. The process also includes dynamically setting a WOLA parameter associated with each OFDM symbol based on the resource allocation information of the respective OFDM symbol and one or more adjacent OFDM symbols. The process further includes applying WOLA on at least one of the OFDM symbols in the next slot based on the WOLA parameter associated with the at least one OFDM symbol.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for wireless communication, comprising:
   at least one processor; and
   memory storing instructions that, when executed by the at least one processor, cause the apparatus at least to:
   calculate a guard band width associated with a symbol based on information about resource allocation to the apparatus;
   set a pulse-shaping parameter associated with the symbol based on the guard band width; and
   output the symbol having a waveform based on the pulse-shaping parameter;
   compare the guard band width with a threshold;
   wherein execution of the instructions further causes the apparatus to, in response to the guard band width being greater than the threshold, set the pulse-shaping parameter such that the waveform of the symbol is in an original form without adjustment,
   wherein execution of the instructions further causes the apparatus to, in response to the guard band width being not greater than the threshold, adjust the waveform of the symbol from the original form to an adjusted form based on the pulse-shaping parameter.

2. The apparatus of claim 1, wherein the information comprises allocation of physical resource blocks (PRBs) on the symbol and one or more adjacent symbols.

3. The apparatus of claim 2, wherein execution of the instructions further causes the apparatus to determine the guard band width based on the allocation of the PRBs and an edge of a channel bandwidth.

4. The apparatus of claim 1, wherein the information comprises an active bandwidth part (BWP) on the symbol and one or more adjacent symbols.

5. The apparatus of claim 4, wherein execution of the instructions further causes the apparatus to determine the guard band width based on the active BWP and an edge of a channel bandwidth.

6. The apparatus of claim 1, wherein the pulse-shaping parameter comprises a weighted overlap-and-add (WOLA) parameter, and execution of the instructions further causes the apparatus to adjust the waveform of the symbol by applying WOLA to the symbol based on the WOLA parameter.

7. The apparatus of claim 1, wherein the pulse-shaping parameter comprises a channel filter parameter, and execution of the instructions further causes the apparatus to adjust the waveform of the symbol by adjusting the channel filter parameter.

8. The apparatus of claim 1, wherein execution of the instructions further causes the apparatus to receive the information about resource allocation to the apparatus in a next slot comprising the symbol.

9. A method for wireless communication, comprising:
   calculating, by at least one processor, a guard band width associated with a symbol based on information about resource allocation to an apparatus comprising the at least one processor;
   setting, by the at least one processor, a pulse-shaping parameter associated with the symbol based on the guard band width; and
   outputting, by the at least one processor, the symbol having a waveform based on the pulse-shaping parameter,
   wherein the method further comprises:
   comparing the guard band width with a threshold;
   in response to the guard band width being greater than the threshold, setting the pulse-shaping parameter such that the waveform of the symbol is in an original form without adjustment,
   in response to the guard band width being not greater than the threshold, adjusting the waveform of the symbol from the original form to an adjusted form based on the pulse-shaping parameter.

10. The method of claim 9, wherein the information comprises allocation of physical resource blocks (PRBs) on the symbol and one or more adjacent symbols.

11. The method of claim 10, further comprising determining the guard band width based on the allocation of the PRBs and an edge of a channel bandwidth.

12. The method of claim 9, wherein the information comprises an active bandwidth part (BWP) on the symbol and one or more adjacent symbols.

13. The method of claim 12, further comprising determining the guard band width based on the active BWP and an edge of a channel bandwidth.

14. The method of claim 9, wherein the pulse-shaping parameter comprises a weighted overlap-and-add (WOLA) parameter, and the method further comprises adjusting the waveform of the symbol by applying WOLA to the symbol based on the WOLA parameter.

15. The method of claim 9, wherein the pulse-shaping parameter comprises a channel filter parameter, and the method further comprises adjusting the waveform of the symbol by adjusting the channel filter parameter.

16. A non-transitory computer-readable storage medium encoded with instructions that, when executed by at least one processor of an apparatus for wireless communication, perform a process comprising:
- calculating a guard band width associated with a symbol based on information about resource allocation to the apparatus;
- setting a pulse-shaping parameter associated with the symbol based on the guard band width; and
- outputting the symbol having a waveform based on the pulse-shaping parameter;
- wherein the process further comprises:
- comparing the guard band width with a threshold;
- in response to the guard band width being greater than the threshold, setting the pulse-shaping parameter such that the waveform of the symbol is in an original form without adjustment,
- in response to the guard band width being not greater than the threshold, adjusting the waveform of the symbol from the original form to an adjusted form based on the pulse-shaping parameter.

\* \* \* \* \*